(12) United States Patent  (10) Patent No.: US 9,230,515 B2
Liu  (45) Date of Patent: Jan. 5, 2016

(54) HAND-HELD ELECTRONIC DEVICE AND DISPLAY METHOD

(71) Applicant: Lenovo (Beijing) Co., Ltd., Beijing (CN)

(72) Inventor: Junfeng Liu, Beijing (CN)

(73) Assignee: LENOVO (BEIJING) CO., LTD., Beijing (CN)

(*) Notice: Subject to any disclaimer, the term of this patent is extended or adjusted under 35 U.S.C. 154(b) by 78 days.

(21) Appl. No.: 13/795,401

(22) Filed: Mar. 12, 2013

(65) Prior Publication Data

US 2013/0235096 A1  Sep. 12, 2013

(30) Foreign Application Priority Data

Mar. 12, 2012 (CN) .......................... 2012 1 0064186
Mar. 12, 2012 (CN) .......................... 2012 1 0064243
Mar. 12, 2012 (CN) .......................... 2012 1 0064244

(51) Int. Cl.
*G09G 5/30* (2006.01)
*G06F 3/14* (2006.01)
(Continued)

(52) U.S. Cl.
CPC .. *G09G 5/30* (2013.01); *G02B 6/00* (2013.01); *G02B 17/006* (2013.01);
(Continued)

(58) Field of Classification Search
CPC ...... F21V 7/04; G02B 26/0841; G02B 27/48; G06F 3/1423; G06F 3/1431; G06F 3/1446; G06F 3/147; G09G 2300/026; G09G 2340/0407; G09G 2340/0421; G09G 5/391; G09G 2340/0414

USPC .......................................................... 345/697
See application file for complete search history.

(56) References Cited

U.S. PATENT DOCUMENTS 5,818,634 A   10/1998   Richard et al.
5,977,950 A   11/1999   Rhyne
(Continued)

FOREIGN PATENT DOCUMENTS

CN   1602447 A     3/2005
CN   101091377    12/2007
(Continued)

OTHER PUBLICATIONS

Chinese First Office Action with English Translation for related Application No. 201210064186.8, dated Nov. 4, 2014, 21 pages.
(Continued)

*Primary Examiner* — Grant Sitta
*Assistant Examiner* — Mihir Rayan
(74) *Attorney, Agent, or Firm* — Brinks Gilson & Lione; G. Peter Nichols

(57) ABSTRACT

A hand-held electronic device and a display method are described. The hand-held electronic device of the invention includes an image processing unit configured to provide a first image; a first display unit configured to display the first image; a first optical system configured to receive light emitted from the first display unit and conduct a light path conversion on it to form a first magnified virtual image, wherein a length of a light path between the first optical system and the first display unit is less than a focal distance of first optical system; and a first window disposed on a first external surface of the hand-held electronic device to allow a viewer to watch the first magnified virtual image through the first optical system when the viewer is close to the first external surface.

12 Claims, 6 Drawing Sheets

(51) Int. Cl.
*H04M 1/02* (2006.01)
*H04N 9/31* (2006.01)
*G06F 1/16* (2006.01)
*G02B 6/00* (2006.01)
*G02B 27/01* (2006.01)
*G02B 17/00* (2006.01)
*G02B 27/02* (2006.01)

(52) U.S. Cl.
CPC ......... *G02B 27/0101* (2013.01); *G02B 27/025* (2013.01); *G06F 1/1616* (2013.01); *G06F 1/1624* (2013.01); *G06F 1/1647* (2013.01); *G06F 3/1423* (2013.01); *H04M 1/0266* (2013.01); *H04N 9/3173* (2013.01); *G02B 2027/0127* (2013.01); *G09G 2340/0407* (2013.01)

(56) References Cited

U.S. PATENT DOCUMENTS

| | | | | |
|---|---|---|---|---|
| 6,029,073 | A | * | 2/2000 | Lebby et al. ............... 455/566 |
| 6,072,443 | A | * | 6/2000 | Nasserbakht et al. ............ 345/7 |
| 6,538,675 | B2 | | 3/2003 | Aratani et al. |
| 6,545,803 | B1 | | 4/2003 | Sakuma et al. |
| 2002/0158812 | A1 | * | 10/2002 | Pallakoff ........................... 345/5 |
| 2006/0146012 | A1 | * | 7/2006 | Arneson et al. ............... 345/156 |
| 2006/0146013 | A1 | | 7/2006 | Arneson et al. |
| 2006/0170615 | A1 | | 8/2006 | Levola |
| 2006/0228091 | A1 | | 10/2006 | Lee |
| 2011/0316783 | A1 | | 12/2011 | Kimura |

FOREIGN PATENT DOCUMENTS

| | | |
|---|---|---|
| CN | 101091377 A | 12/2007 |
| CN | 101095343 A | 12/2007 |
| CN | 101169929 | 4/2008 |
| CN | 102300127 | 12/2011 |
| JP | 2002-51278 A | 2/2002 |
| WO | WO 2006/074132 | 7/2006 |

OTHER PUBLICATIONS

Chinese First Office Action with English Translation for related Application No. 201210064244.7, dated Nov. 25, 2014, 16 pages.
Chinese Second Office Action with English Translation for related Application No. CN201210064186.8 dated Jul. 15, 2015 (21 pages including English translation).
Chinese Second Office Action with English Translation for related Application No. 201210064244.7 dated Jul. 16, 2015 (7 pages including English translation).
Chinese First Office Action with English Translation for related Application No. 201210064243.2, dated Aug. 10, 2015, 35 pages.

* cited by examiner

HAND-HELD ELECTRONIC DEVICE AND DISPLAY METHOD

This application claims priority to Chinese patent application No. CN201210064186.8 filed on Mar. 12, 2012; CN201210064244.7 filed on Mar. 12, 2012; and CN201210064243.2 filed on Mar. 12, 2012, the entire contents of each are incorporated herein by reference.

BACKGROUND

The present invention relates to a hand-held electronic device and a display method for hand-held electronic device.

Presently, hand-held electronic devices with a big screen, such as smart phone or the like, are more and more popular with users. However, the size of screen of hand-held electronic device is limited by portable characteristics after all, which is not beyond 4 inches or 5 inches generally. However with the development of the technology, the processing capacity of processor is enhanced, thus functions provided by the portable electronic device to the users are increased continuously such that the screen size of the existing hand-held device can no longer meet the users' requirements which are more and more diverse. For example, the image size of the existing hand-held electronic device display is small and the resolution of the display screen is low, the user would have a worse experience when watching a video through hand-held electronic device. Accordingly, it is desired that a portable electronic device provide a user bigger visual experience while ensuring the portability of the electronic device is provided.

SUMMARY

The embodiments of the invention aim at providing a hand-held electronic device and a display method applied to the hand-held electronic device to solve the above issues.

The embodiments of the invention provide a hand-held electronic device comprising: image processing unit configured to provide a first image; a first display unit configured to display the first image; a first optical system configured to receive light emitted from the first display unit and conduct light path conversion on it to form a first magnified virtual image, wherein a length of a light path between the first optical system and the first display unit is less than a focal distance of the first optical system; a first window disposed on a first external surface of the hand-held electronic device to allow a viewer to watch the first magnified virtual image through the first optical system when close to the first external surface.

The embodiments of the invention also provide a display method applied to the hand-held electronic device. The method comprises: providing a first image by a image processing unit; displaying the first image by the first display unit; receiving light emitted from the first display unit and conducting a light path on it by the first optical system to form a first magnified virtual image, wherein a length of a light path between the first optical system and the first display unit is less than a focal distance of first optical system.

In the hand-held electronic device and the display method according to the embodiments of the invention, a image size which the user may watch is not limited by a screen size of the hand-held device itself, such that the user may watch a display image with a relatively big size through the hand-held device while the portability of the hand-held device is kept. Additionally, compared with a micro-projector, the hand-held device and the display method according to this embodiment have considerably low consumption and not limited by ambient light. The hand-held device and the display method according to the embodiment of the invention may be used to watch a video or a picture both in outdoors with strong light and indoors with weak light.

Additionally, as described above, since the viewer can just watch the first magnified virtual image through the first optical system when close to the first external surface, such that the content watched by the user is avoided to be seen or peeped by others so as to improve the privacy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

To better illustrate the technical solutions of the embodiments of the invention, the accompany drawings used in the description of the embodiments of the invention will be described briefly.

DETAILED DESCRIPTION

Hereinafter the preferred embodiments of the invention will be described with reference to the accompany drawings.

It is noted that like reference numbers are used to represent the same step and element and the repeated explanation for them will be omitted.

Figure 1:
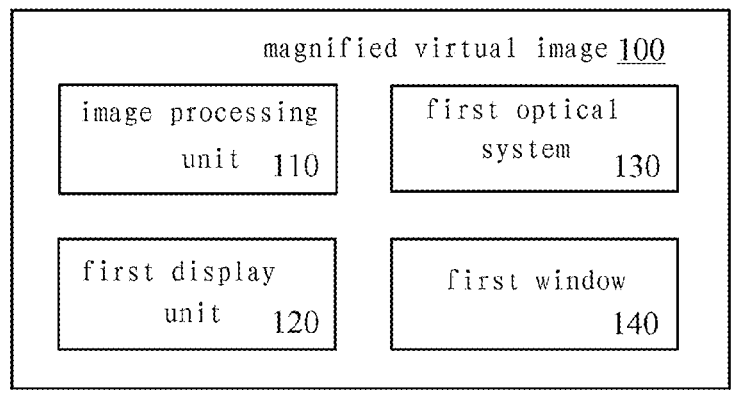
FIG. 1 shows an exemplary block diagram of a hand-held electronic device according to one embodiment of the invention.

In the following embodiment of the invention, the concrete form of a hand-held electronic device comprises, but not limited to, mobile phone, personal digital assistant, media player (for example MP4), PlayStation, tablet computer, GPS device and the like. FIG. 1 shows an exemplary block diagram of a hand-held electronic device 100 according to one embodiment of the invention. As shown in FIG. 1, the hand-held electronic device 100 comprises an image processing unit 110, a first display unit 120, a first optical system 130 and a first window 140.

The image processing unit 110 may provide a first image. The first image may be, for example, picture, video image, text, or combination of picture and text, or the like. The image processing unit 110 may be a central processing unit of the hand-held electronic device (for example CPU), or alternatively, may also be an image processing unit disposed separately physically or logically.

The first display unit 120 may display the first image provided by the image processing unit 110. According to one example of the invention, the first display unit 120 may be a micro-display unit, the size of screen of which is less than that of the existing hand-held device. Additionally, according to another embodiment of the invention, the first display unit 120 has a relatively high resolution. Specifically, the resolution of the screen of the first display unit 120 may be higher than that of the existing hand-held device. For example, the first display unit 120 may employ a display screen meeting the high definition or the full high definition standard. Since the screen size of first display unit 120 is very small, in the example of the invention, it is difficult for a user the first image displayed by the first display unit 120 through naked eyes. Additionally, in the case that the hand-held device has a relatively high resolution of screen, the resolution of screen of first display unit 120 may be equal to that of the hand-held device.

The first optical system 130 may receive light emitted from the first display unit 120 and convert the light path for the light emitted from the first display unit 120 to form a first magnified virtual image, wherein the length of the light path between the first optical system 130 and the first display unit 120 is less than the focal distance of first optical system. That is to say, the first optical system 130 has positive refractive power. The magnification of first optical system 130 may be pre-set. Alternatively, the first optical system 130 may comprises a first adjusting component to adjust the magnification of first optical system 130, which will be described in detail later. The area of the first magnified virtual image is greater than the area of the display zone of first display unit.

Figure 2A:
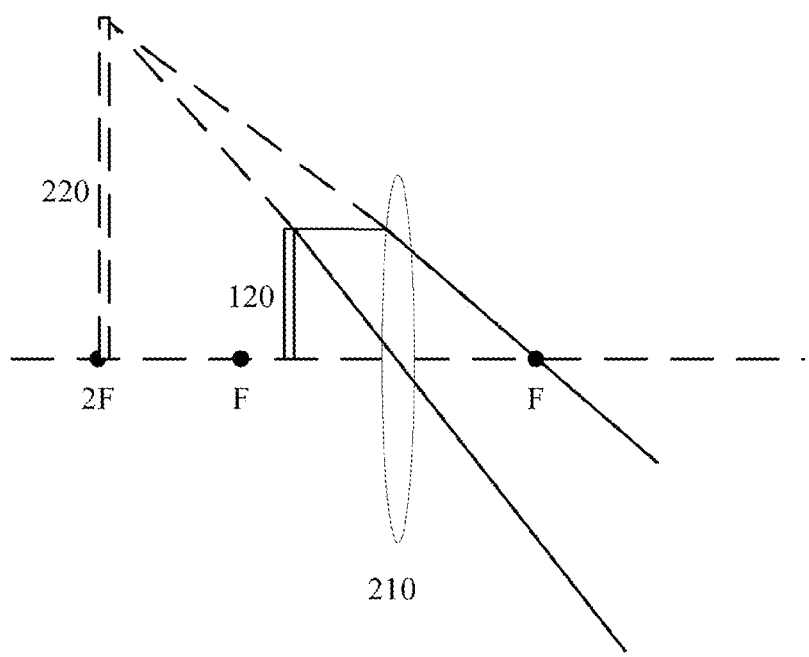
FIG. 2A is a schematic view showing a lens assembly according to one example of the invention.

According to one example of the invention, the first optical system 130 at least comprises a lens assembly having positive refractive power. FIG. 2A is a schematic view showing the lens assembly according to one example of the invention. As shown in FIG. 2, the lens assembly may comprise one convex lens 210. The convex lens 210 may receive light emitted from the first display unit 120 and convert the light path for the light emitted from the first display unit 120 to from the first magnified virtual image 220.

Although the light path conversion for the light emitted from the first display unit 120 is described by taking an light ray as an example in FIG. 2A, it should be noted actually those emitted from the first display unit 120 is a set of light composed of a plurality of light rays, and the set of light rays is processed by light path conversion through the convex lens 210 to form the first magnified virtual image 220.

Figure 2B:
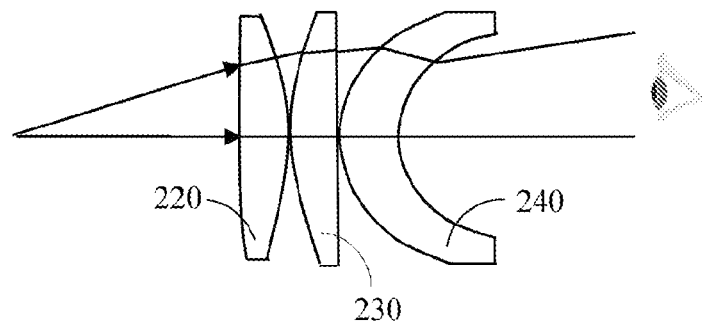
FIG. 2B is a schematic view showing a lens assembly according to another example of the invention.

Additionally, to reduce and avoid the interference to imaging caused by aberration and dispersion so as to bring the user better visual experience, the lens assembly may be formed from a plurality of lenses including convex lens and concave lens. As described above, this lens assembly formed from a plurality of lenses has positive refractive power, i.e., is equivalent to a convex lens. FIG. 2B is a schematic view showing a lens assembly according to another example of the invention. As shown in FIG. 2B, the lens assembly may comprise a single convex lens 220, a single convex lens 230 and a concave-convex lens 240.

The image processing unit 110, the first display unit 120 and the first optical system 130 may be disposed inside the hand-held electronic device 100. The first window 140 may be disposed on a first external surface of hand-held electronic device 100, to enable the viewer to see the first magnified virtual image through the first optical system when close to the first external surface. According to one example of the invention, the size of first window 140 may correspond to that of the human eyes, and the first window 140 may be disposed on the first external surface of the case of the hand-held electronic device.

According to one example of the invention, in the hand-held electronic device, the first display unit 120 is disposed on a side of the first optical system 130, which allows the viewer to watch the first magnified virtual image on the other side of the first optical system, which is opposite to the first display unit 120.

By way of the hand-held electronic device provided by the above embodiment of the invention, the image size that a user may watch is not limited by the screen size of the hand-held device itself, such that the user may watch a display image with a relatively big size through the hand-held device while the portability of the hand-held device is kept. Additionally, compared with a micro-projector, the hand-held device according to this embodiment has considerably low consumption and not limited by ambient light. The hand-held device according to the embodiment of the invention may be used to watch a video or a picture both in outdoors with strong light and indoors with weak light.

Additionally, as described above, since the viewer can just watch the first magnified virtual image through the first optical system when close to the first external surface, such that the content watched by the user is avoided to be seen or peeped by others so as to improve the privacy.

Figure 3:
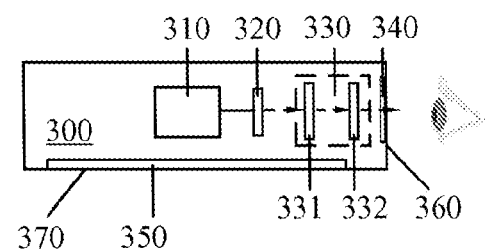
FIG. 3 is a basic construction example of a hand-held electronic device according to another embodiment of the invention.

FIG. 3 is a basic construction example showing a hand-held electronic device according to another embodiment of the invention. Similar to the hand-held electronic device 100 shown in FIG. 1, a hand-held electronic device 300 comprises an image processing unit 310, a first display unit 320, a first optical system 330 and a first window 340. Additionally, the hand-held electronic device 300 further comprises a second display unit 350.

The image processing unit 310 may provide a first image. The first image may be, for example, picture, video image or combination of text and picture and the like. The first display unit 320 may display the first image provided by the image processing unit 310. As shown in FIG. 3, in this embodiment, the first display unit 320 is a micro-display unit disposed inside the hand-held electronic device 300. Since the screen size of the first display unit 320 is very small, in this embodiment, it is difficult for a user to clearly watch the first image displayed by the first display unit 320 through naked eyes.

The first optical system 330 may receive light emitted from the first display unit 320 and convert the light path for the light emitted from the first display unit to from a first magnified virtual image. The first optical system 330 comprises a lens assembly composed of a first lens 331 and a second lens 332. The lens assembly has positive refractive power, i.e., the first lens 331 and the second lens 332 may be equivalent to a convex lens.

As shown in FIG. 3, the first display unit 320 and the first optical system 330 are disposed along an optical axis of the lens assembly (i.e., the first lens 331 and the second lens 332) correspondingly. In this embodiment, a length of the light path between the first optical system 330 and the first display unit 320 is less than a focal distance of the first optical system 330. More specifically, the length of light path between the first optical system 330 and the first display unit 320 is less than the focal distance of the lens assembly. The distance between the first lens 331 and the second lens 332 and a distance between the first display unit 320 and the first optical system 330 may be determined according to a magnification required by the first optical system 330. For example, the magnification required by the first optical system 330 bigger, the length of the light path between the first optical system 330 and the first display unit 320 longer. Additionally, the distance between the first optical system 330 and the first window 340 may be determined according to the predetermined positions of the eyes of viewer.

The first window 340 is disposed on a first external surface of hand-held electronic device to enable the viewer to watch the first magnified virtual image through the first optical system 330. As shown in FIG. 3, the size of the first window 340 may correspond to that of human eyes, and the first window 340 and the first optical system 330 are disposed along an optical axis of the lens assembly (i.e., the first lens 331 and the second lens 332) correspondingly. The first display unit 320 is disposed on a side of the first optical system 330, and the first window 340 is disposed on the other side of the first optical system 330 opposite to the first display unit 320, for the viewer watching the first magnified virtual image. The first window 340 may be disposed on the first external surface 360 of a case of the hand-held electronic device.

The second display unit 350 may display a second image. A display zone of second display unit 350 is greater than that of the first display unit, and the second display unit 350 enables the viewer to watch the second image directly. That is to say, it is no need to conduct a light path conversion on the image displayed by the second display unit by the optical system, such that the viewer may watch the second image displayed by the second display unit directly.

The second display unit 350 may be, for example, a display unit disposed on the external surface of an existing hand-held electronic device. That is to say, the size of screen of the second display unit 350 is greater than that of the first display unit 320. Additionally, the resolution of the first display unit 320 may be higher than that of the second display unit 350, such that the viewer can watch the clear first magnified virtual image. In the hand-held electronic device according to the embodiment of the invention, the size of the first magnified virtual image is greater than the size of screen of the second display unit 350. For example, the second display unit 350 may comprise a screen of 4 inches or 5 inches, and the first magnified virtual image may be 50 inches.

The second display unit 350 may be disposed on a second external surface 370 of hand-held electronic device 300. As shown in FIG. 3, the first external surface 360 is adjacent to the second external surface 370. That is to say, the first display unit 320, the first optical system 330 and the first window 340 are disposed along the length or width direction of the hand-held electronic device 300 correspondingly so as to avoid increasing thickness of hand-held electronic device 300.

Figure 4:
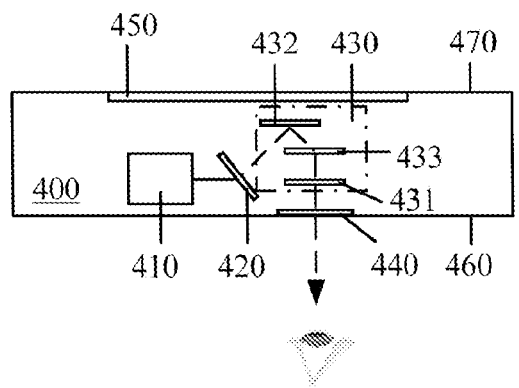
FIG. 4 is a basic construction example of a hand-held electronic device according to another embodiment of the invention.

FIG. 4 is a basic construction example showing a hand-held electronic device 400 according to another embodiment of the invention. Similar to the hand-held electronic device 100 shown in FIG. 1, the hand-held electronic device 400 comprises an image processing unit 410, a first display unit 420, a first optical system 430 and a first window 440. Additionally, the hand-held electronic device 400 also comprises a second display unit 450.

The image processing unit 410 may provide a first image. The first image may be, for example, picture, video image or combination of text and picture. The first display unit 420 may display the first image provided by the image processing unit 410. As shown in FIG. 4, in this embodiment, the first display unit 420 is a micro-display unit disposed inside the hand-held electronic device 400. Since the screen size of the first display unit 420 is very small, in this embodiment, it is difficult for a user to watch the first image displayed by the first display unit 420 through naked eyes.

The first optical system 430 may receive light emitted from the first display unit 420 and conduct a light path conversion on the light emitted from the first display unit to form a first magnified virtual image. The first optical system 430 comprises a lens assembly composed of a first lens 431. The lens assembly has positive refractive power.

As shown in FIG. 4, the first display unit 420 and the first optical system 430 are disposed offset from an optical axis of lens assembly (i.e., the first lens 431). The first optical system 430 further comprises a first light guiding component. The first light guiding component may deliver light emitted from the first display unit 420 to the lens assembly. In the example shown in FIG. 4, the first light guiding component comprises a first light guiding means 432 (for example, a flat mirror) and a second light guiding means 433, however, the invention is not limited to it, for example, the first light guiding component may also be an optical fiber or the like.

In this embodiment, a length of a light path between the first optical system 430 and the first display unit 420 is less than a focal distance of the first optical system 430. More specifically, the length of the light path between the first optical system 430 and the lens assembly (i.e., the sum of the light path length between the first optical system 430 and the first light guiding component including the first light guiding means 432, the light path length between the first light guiding means 432 and the second light guiding means 433 and the light path length between the second light guiding means 433 and the first lens 431) is less than the focal distance of lens assembly. Additionally, the first light guiding component and the lens assembly may be form by an optical means (for example, an optical means with a free surface).

The first window 440 is disposed on a first external surface of the hand-held electronic device to enable the viewer to watch the first magnified virtual image through the first optical system 420. As shown in FIG. 4, the size of the first window 440 may correspond to the size of human eyes. Although in the example shown in FIG. 4 the first window 440 and the lens assembly are disposed along the optical axis of the lens assembly (i.e., first lens 431) correspondingly, the invention is not limited to it. Alternatively, the light guiding component may be disposed between the first window 440 and the lens assembly such that the first window 440 may be disposed offset from the optical axis of the lens assembly.

The second display unit 450 may display a second image. Similar to the first image, the second image may be picture, video image or combination of text and picture and the like. A display zone of second display unit 450 is greater than that of the first display unit, and the second display unit 450 allows a viewer to watch the second image directly. That is to say, there is no need for light path conversion by the optical system on the image displayed by the second display unit, such that the viewer may watch the second image displayed by the second display unit directly.

The second display unit 450 may be, for example, a display unit disposed on an external surface of the existing hand-held electronic device. That is to say, a size of screen of the second display unit 450 is greater than that of the first display unit 420. Additionally, a resolution of the first display unit 420 may be higher than that of the second display unit 450. Therefore the viewer may watch the clear first magnified virtual image. In the hand-held electronic device according to the embodiment of the invention, the size of first magnified virtual image is greater than the size of screen of the second display unit 450. For example, the second display unit 450 may comprise a screen of 4 inches or 5 inches, and the first magnified virtual image may be 50 inches.

The second display unit 450 may be disposed to a third external surface 470 of the hand-held electronic device 400. As shown in FIG. 4, the first external surface 460 is opposite to the third external surface 470. That is to say, the first display unit 420, the first optical system 430 and/or the first window 440 are/is disposed offset from the optical axis of the lens assembly along a direction of thickness of the hand-held electronic device 400, and the length of the light path between the first display unit 420 to the first optical system 430 Is increased by the first light guiding component so as to avoid increasing the thickness of the hand-held electronic device 400.

As described above, in the hand-held electronic device according to the embodiment of the invention, the first optical system at least comprises a lens assembly having positive refractive power. Additionally, according to another embodiment of the invention, the first optical system may further comprise a protective component. The protective component is disposed on a side close to the viewer in the first optical system to protect the lens assembly. The protective component may be, for example, a cover glass and the like.

Additionally, according to another embodiment of the invention, the first optical system may further comprise a first adjusting component configured to change a distance between the lens assembly and the first display unit to adjust the size of the first magnified virtual image. For example, when the lens assembly comprises a convex lens, the first adjusting component may change the length of the light path between this convex lens and the first display unit. When the lens assembly comprises a plurality lenses, the first adjusting component may change the length of the light path between the entire lens assembly and the first display unit, or adjust the position of each of lenses alone to adjust the size of the first magnified virtual image. During adjusting, the protective component may be always below the first external surface of the hand-held electronic device or kept flush with the first external surface of the hand-held electronic device.

Optionally, the first adjusting component comprises a deployed state and a stowed state, with the protective component being located on the first external surface when the first adjusting component is in the stowed state and plain glass is beyond the first external surface in the direction of the optical axis of the lens assembly when the first adjusting component is in the deployed state. Alternatively, when the first adjusting component is in the stowed state, the protective component may be below the first external surface. Therefore, even the first display unit, the first optical system and the first window are disposed in the direction of the thickness of the hand-held electronic device may also avoid increasing the thickness of hand-held electronic device.

Figure 5:
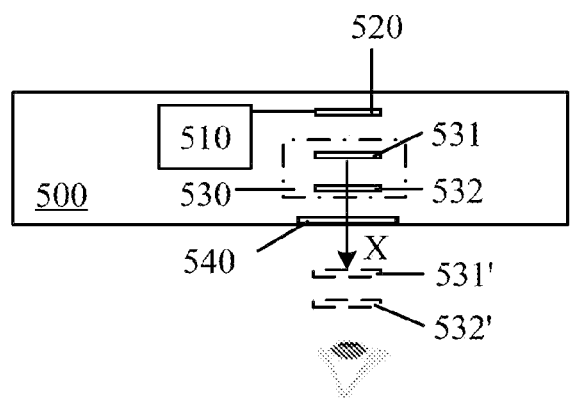
FIG. 5 is a basic construction example of a hand-held electronic device according to yet another embodiment of the invention.

FIG. 5 is a basic construction example showing a hand-held electronic device 500 according to another embodiment of the invention. Similar to the hand-held electronic device 100 shown in FIG. 1, the hand-held electronic device 500 comprises an image processing unit 510, a first display unit 520, a first optical system 530 and a first window 540. The image processing unit 510, the first display unit 520 and the first window 540 are similar to the image processing unit 110, the first display unit 120 and the first window 140 shown in FIG. 1, which will not be described here.

The first optical system 530 may comprise a lens assembly 531, a protective component 532 and a first adjusting component. In the example shown in FIG. 5, the first display unit 520, the lens assembly 531, the protective component 532, the first adjusting component and the first window 540 are disposed in the direction of thickness of the hand-held electronic device 500 correspondingly. However, the invention is not limited to it, and for example, the first display unit 520, the lens assembly 531, the protective component 532 and the first window 540 may be disposed in the direction of length or width of the hand-held electronic device correspondingly.

In this embodiment, a length of a light path between the first optical system 530 and the first display unit 520 is less than a focal distance of first optical system 530. More specifically, the length of the light path between the first optical system 530 and the first display unit 520 is less than the focal distance of the lens assembly. Additionally, the first adjusting component may change the distance between the lens assembly 531, protective component 532 and the first display unit 520 to adjust the size of the first magnified virtual image. For example, when the magnification needed of the first optical system 530 is bigger, the length of the light path between the lens assembly 531 and/or the protective component 532 and the first display unit 520 may be longer by adjusting the first adjusting component.

The first adjusting component may change the distance between the lens assembly 531, the protective component 532 and the first display unit 520 to adjust the size of the first magnified virtual image. A first adjusting component 533 comprises a deployed state and a stowed state, with the lens assembly 531 and the protective component 532 being located inside the hand-held electronic device 500 when the first adjusting component is in the stowed state and the lens assembly 531 and the protective component 532 being moved along the arrow X, passing through a first external surface 560 disposed on the first window 540 and being beyond the first external surface 560 of hand-held electronic device 500, as the lens assembly 531' and the protective component 532' shown by dashed line in FIG. 5 when first adjusting component is in the deployed state.

According to one example of the invention, the first adjusting component may comprise brackets, grooved sliding rail s and rotary buttons disposed for the lens assembly and the protective component respectively. The viewer may change the position of the lens bracket on the grooved sliding rail by adjusting the rotary buttons so as to adjust the length of the light path between the lens assembly and the protective component and the first display unit 520. The positions of each of the lens and the protective component in the lens assembly may be adjusted if desired, alternatively, the position of lens assembly and the protective component may be adjusted simultaneously.

As described above, in the hand-held electronic device according to the embodiment of the invention, the first optical system at least comprises a lens assembly having positive refractive power. Additionally, according to another embodiment of the invention, a light guiding component may be disposed between the first window and the lens assembly, such that when the first window is disposed offset from the optical axis of the lens assembly, the viewer may also watch the first magnified virtual image. Specifically, the first optical system may further comprise: a second light guiding component and a third light guiding component. The second light guiding component may deliver the light passing through the lens assembly to the third light guiding component, and the third light guiding component may receive the light delivered by the second light guiding component and reflect it to the first window.

According to one example of the invention, the second light guiding component may comprise, for example, an optical means such as flat mirror or optical fiber or the like, to deliver the light passing through the lens assembly to the third light guiding component. The third light guiding component may comprise a plurality of light reflection assemblies disposed in parallel to reflect the light delivered from the second light guiding component to the first window such that the viewer may watch the first magnified virtual image through the first window.

Optionally, when the first optical system further comprises a protective component disposed on a side close to the viewer in the first optical system to protective the lens assembly, the third light guiding component is disposed in the protective component. The protective component may be, for example, a cover glass or the like. Additionally, as described above, the hand-held electronic device may further comprise a second display unit for displaying second image. A display zone of second display unit is larger than that of the first display unit, and the second display unit allows the viewer to watch the second image directly. That is to say, there is no need to conduct a light path conversion by the optical system on the image displayed by the second display unit, and the viewer may watch the second image displayed by the second display unit directly.

According to one example of the invention, the second display unit is disposed on the third external surface of hand-held electronic device, with the first external surface opposite to the third external surface. The first display unit, the first optical system and the first window may be disposed along the optical axis of the lens assembly correspondingly.

Alternatively, according to another example of the invention, the second display unit is disposed on the first external surface of hand-held electronic device. The protective component containing the third light guiding component covers on the second display unit as a layer and overlaps the second display unit. For example, the second display unit may be, for example, a display unit disposed on the external surface of the existing hand-held electronic device. And the protective component may be protective glass covering on the second display unit. The first window may be same as the window disposed for the second display unit, which is on the first external surface of hand-held electronic device. Thus, when the viewer faces the first external surface, the viewer can watch the first magnified virtual image of first image displayed by the first display unit through the light reflection assembly, and watch the second image directly through the second display unit. That is to say, there is no need to conduct a light path conversion by the optical system on the image displayed by the second display unit and the viewer may watch the second image displayed by the second display unit directly.

Figure 6:
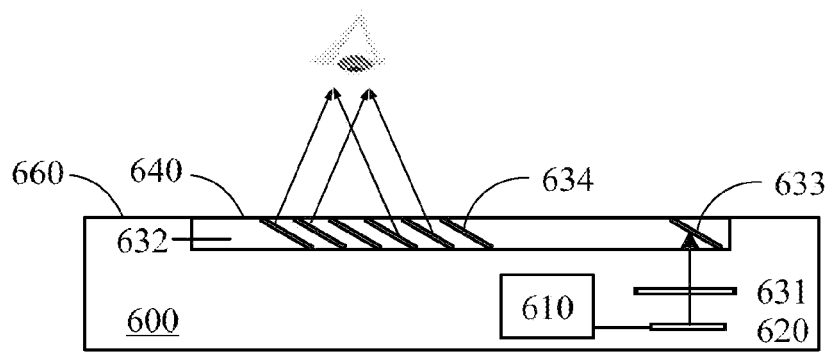
FIG. 6 is a basic construction example of a hand-held electronic device according to yet another embodiment of the invention.

FIG. 6 is a basic construction example of a hand-held electronic device 600 according to another embodiment of the invention. Similar to the hand-held electronic device 100 shown in FIG. 1, the hand-held electronic device 600 comprises an image processing unit 610, a first display unit 620, a first optical system and a first window 640. The image processing unit 610, the first display unit 620 and the first window 640 are similar to the image processing unit 110, the first display unit 120 and the first window 140 in FIG. 1, which are not described here which are not described here. As shown in FIG. 6, the image processing unit 610 and the first display unit 620 are disposed inside the hand-held electronic device 600, and the first window 640 is disposed on a first external surface 660 of hand-held electronic device 600.

The first optical system may comprise a lens assembly 631, a protective component 632, a second light guiding component 633 and a third light guiding component 634. As shown in FIG. 6, lens assembly 631 is disposed inside the hand-held electronic device 600 for receiving light emitted from the first display unit 620. The protective component 632 is disposed at the first window 640 of the first external surface 660 of the electronic device 600 to protect the lens assembly 631. The second light guiding component 633 delivers the light passing through the lens assembly 631 to the third light guiding component 634. In the example shown in FIG. 6, the second light guiding component 633 is a reflector, however, the invention is not limited to it, and for example, the second light guiding component 633 may also be an optical fiber.

As shown in FIG. 6, the third light guiding component 634 comprises a plurality of light reflection assemblies disposed in parallel to reflect the light delivered from the second light guiding component to the first window, such that the viewer may watch the first magnified virtual image through the first window. According to one example of the invention light reflection assembly may be, for example, reflector.

Alternatively, the light reflection assembly may be a transparent reflective means. The hand-held electronic device 600 may further comprise a second display unit (not shown) for displaying the second image. The second display unit may overlap the protective component. Therefore, when the viewer faces the first external surface, the viewer can watch the first magnified virtual image of first image displayed by the first display unit through the light reflection assembly, and watch the second image directly through the second display unit.

Additionally, when the user watches the second image through the second display unit, the third light guiding component may be set into a transmitting mode, and when the user watches the first image through the first display unit, the third light guiding component may be set into reflecting mode.

Figure 7A:
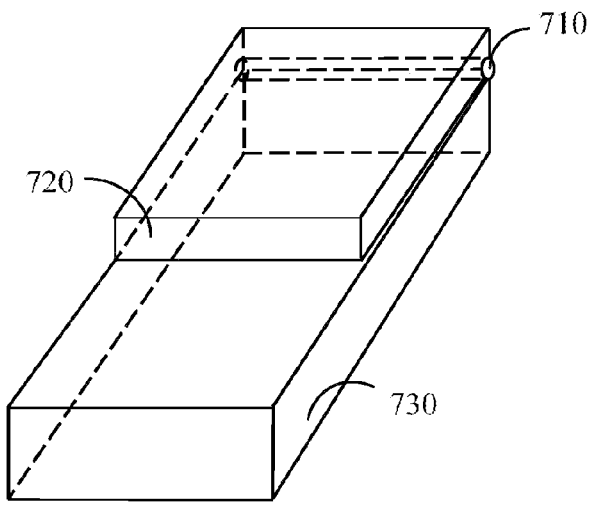
FIG. 7a and FIG. 7b are schematic views showing a hand-held electronic device according to another embodiment of the invention.
Figure 7B:
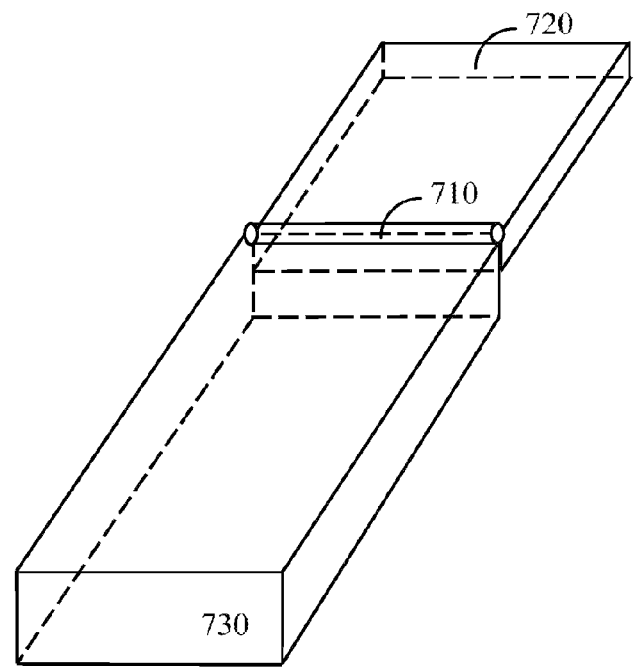

FIG. 7a and FIG. 7b are schematic views of a hand-held electronic device according to another embodiment of the invention. In the example shown in FIG. 7a and FIG. 7b, the hand-held electronic device shown in FIG. 6 further comprises a hinge 710 which can rotate about a center of the hinge, a first housing 720 connected to the hinge, which can rotate relative to the center of the hinge, and a second housing 730 connected to the hinge, which can rotate relative to the center of hinge. In the hand-held electronic device shown in FIG. 6, at least the third light guiding component and the first window are disposed in the first housing 720 of the hand-held electronic device, and the first housing 720 may be transparent housing. Specifically, the first housing 720 may comprise the protective component and the third light guiding component disposed therein. As shown in FIG. 7b, the user may rotate the first housing such that it is separated from the second housing of the hand-held electronic device. Since the first housing is transparent, when the first magnified virtual image is watched, the real environment can be seen to avoid the accident of the viewer, such as tumble, knocking down the obstacle or the like.

Alternatively, the first housing may comprise all subassemblies in the first display unit and the first optical system, as well as the first window, to shorten the light path to avoid dispersion or deformation of image. In this case, the first housing may be provided as partially transparent, wherein the third light guiding component and the first window may be disposed in the transparent portion of the first housing.

Figure 8A:
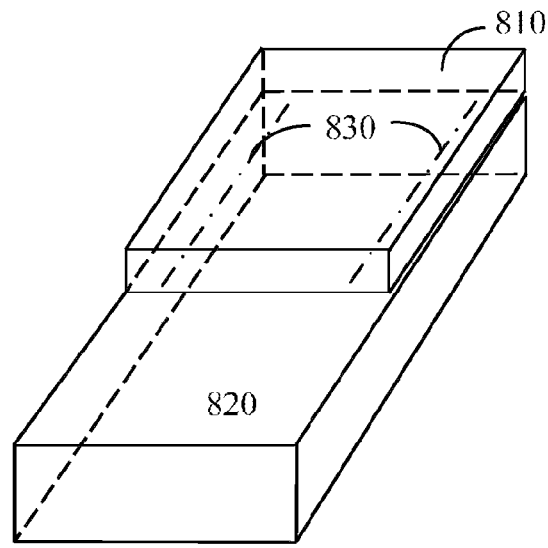
FIG. 8a and FIG. 8b are schematic views showing a hand-held electronic device according to yet another embodiment of the invention.
Figure 8B:
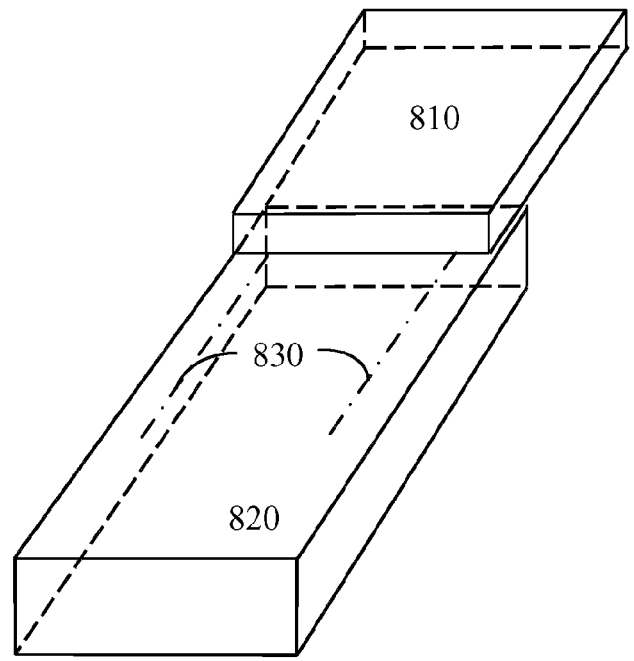

FIG. 8a and FIG. 8b are schematic views of a hand-held electronic device according to another embodiment of the invention. In the example shown in FIG. 8a and FIG. 8b, the hand-held electronic device shown in FIG. 6 further comprises a first housing 810 and a second housing 820. Specifically, the first housing 810 may be connected to the second housing of the hand-held electronic device through a sliding rail device, and may be moved relative to the second housing along the sliding rail 830. Similarly, the second housing 820 may be connected to the first housing of the hand-held electronic device through the sliding rail device, and may be moved relative to the first housing along the sliding rail. The rails of sliding rail device may be disposed on one of the first housing and the second housing, and the sliding component may be disposed on the other of the first housing and the second housing.

As in the hand-held electronic device shown in FIG. 6, at least the third light guiding component and the first window in the first optical system are disposed in the first housing of the hand-held electronic device 820 which may be a transparent housing. Specifically, the first housing 820 may comprise the protective component and the third light guiding component disposed therein. As shown in FIG. 8b, the user may slide the first housing such that it may be separated from the second housing of the hand-held electronic device. Since the first housing is transparent, when the first magnified virtual image is watched, the real environment can be seen to avoid the accident of the viewer, such as tumble, knocking down the obstacle or the like.

Alternatively, the first housing may comprise all subassemblies in the first display unit and the first optical system, as well as the first window, to shorten the light path to avoid dispersion or deformation of image. In this case, the first housing may be provided as partially transparent, wherein the third light guiding component and the first window may be disposed in the transparent portion of the first housing. Additionally, according to another embodiment of the invention, the hand-held electronic device shown in FIG. 1 to FIG. 5 may further comprise an image acquisition unit to shoot a third image. The image acquisition unit transmits the third image shot to an image processing unit, wherein the image acquisition unit is disposed on the third external surface of the hand-held electronic device. The third external surface is opposite to the first external surface disposed on the first window. The image processing unit may generate the first image according to the third image.

For example, the image processing unit may comprise a reproduction module. The reproduction module may reproduce, for example, a second image, such as picture, video image, or combination of text and picture. The image processing unit may generate the first image according to the third image and the second image. For example, in the first image, the image processing unit may dispose the third image on the lower layer of the second image, and set the second image into a first transparency, alternatively, the image processing unit may dispose the third image on the lower layer of the second image, and set the size of the second image as less than that of the third image, such that the user can see the surroundings while watching the reproduced video image.

Additionally, according to another embodiment of the invention, the hand-held electronic device shown in FIG. 1 to FIG. 5 may further comprise short range sensing unit to sense whether a distance between the viewer and the first window is less than or equal to a predetermined threshold. The short range sensing unit may generate a distance detecting result and transmit it to the image processing unit. The image processing unit can control a working mode of the hand-held electronic device according to the distance detecting result. For example, the image processing unit controls the opening or closing of the first display unit according to the distance detecting result.

Additionally, for convenience of the user watching the magnified first image through two eyes at the same time, the hand-held electronic device according to the embodiment of the invention may further comprise a third display unit, a second optical system and a second window. Specifically, the third display unit may display the first image. The second optical system may receive light emitted from the third display unit and conduct light path conversion on it to form a second magnified virtual image, wherein a length of a light path between the second optical system and the third display unit is less than a focal distance of second optical system. The second window is disposed on the first external surface of the hand-held electronic device to allow the viewer to watch the second magnified virtual image when closing to the first external surface. The first window and the second window may be disposed according to a distance between two eyes of the viewer. Alternatively, the hand-held electronic device may further comprise a second adjusting component to adjust the first optical system and/or the second optical system according to the distance between two eyes of the viewer. For example, a position of the first optical system may be fixed and the second optical system may be adjusted according to the distance between two eyes of the viewer, vice versa. Alternatively, the positions of the first optical system and the second optical system may be adjusted by the second adjusting component.

Similar to the first optical system, the second optical system at least comprises a lens assembly having positive refractive power. The lens assembly may comprise, for example, a convex lens. Additionally, to reduce and avoid the interference to imaging caused by aberration and dispersion so as to bring the user better visual experience, the lens assembly may be formed of lenses including a convex lens and a concave lens.

The first display unit and the third display unit may be a display unit disposed separately. The first display unit and the first optical system may de disposed along an optical axis of the lens assembly of first optical system correspondingly, and the third display unit and the second optical system may be disposed an optical axis of the lens assembly of the second optical system correspondingly.

Alternatively, the first optical system may comprise a first light guiding component. The first display unit and the first optical system may be disposed offset from the optical axis of the lens assembly of the first optical system, and the light emitted from the first display unit may be delivered to the lens assembly by the first light guiding component. And the second optical system may comprise a fourth light guiding component. The third display unit and the second optical system may be disposed offset from the optical axis of the lens assembly of the second optical system, and the light emitted from the third display unit is delivered to the lens assembly by the fourth light guiding component. The first display unit and the third display unit may be the same display unit.

Additionally, similar to the first optical system, the second optical system may further comprise a protective component disposed close to a side of the viewer in the second optical system to protect the lens assembly in the second optical system. And the second optical system may further comprise a third adjusting component configured to the distance between the second display unit and the lens assembly in the second optical system to adjust the size of second magnified virtual image. According to one example of the invention, the first optical unit and the second optical unit are disposed correspondingly, and in this case, the first adjusting component may be same as the third adjusting component. That is to say, the viewer may control the magnified virtual image size of the first image by an adjusting component.

Additionally, similar to the first optical system, the light guiding component may be disposed between the second window and the lens assembly of second optical system, such that when the second window is disposed offset from the optical axis of the lens assembly of the second optical system, viewer may also watch the second magnified virtual image. Specifically, the second optical system may further comprise: a fifth light guiding component and a sixth light guiding component. The fifth light guiding component may deliver the light passing through the lens assembly of the second optical system to the sixth light guiding component, and in turn the sixth light guiding component may receive the light delivered by the fifth light guiding component and reflect it to the second window. When the second optical system further comprises the protective component disposed close to the side of the viewer in the second optical system to protect the lens assembly, the sixth light guiding component is disposed in the protective component.

According to one example of the invention, the protective component of the first optical system may be same as the protective component of the second optical system. For example, as described above, the hand-held electronic device may further comprise the second display unit for displaying the second image. The display zone of second display unit is greater than that of the first display unit, and the second display unit allows the viewer to watch the second image directly. According to one example of the invention, the second display unit is disposed to the first external surface of the hand-held electronic device. The protective component containing the third light guiding component and the sixth light guiding component may cover on the second display unit, and the protective component may overlap the second display unit. Therefore, when the viewer faces the first external surface, the first magnified virtual image and the second magnified virtual image may be watched by the third light guiding component and the sixth light guiding component, and the second image can be watched by the second display unit viewer directly.

Additionally, according to another example of the invention, the hand-held electronic device 100 shown in FIG. 1 may have a first working mode and a second working mode. When the hand-held electronic device is operated in the first working mode, the first display unit is open to display first image by the first display unit, and when the hand-held electronic device is operated in the second working mode, the first display unit is closed.

Specifically, the hand-held electronic device 100 may further comprise a condition determination unit and a mode controlling unit.

The condition determination unit may determine whether a mode switching condition is met. According to one example of the invention, the hand-held electronic device 100 may further comprise a first detecting unit. The first detecting unit may determine whether the distance between the viewer and the first window is less than or equal to a module switching distance, and obtain a detecting result. The condition determination unit may determine whether the mode switching condition is met according to the detecting result. The mode switching condition may comprise a first mode switching condition and a second mode switching condition, wherein the first mode switching condition is that the distance between the viewer and the first window changes from greater than the module switching distance to less than or equal to the module switching distance, and the second mode switching condition is that the distance between the viewer and the first window changes from less than or equal to the module switching distance to greater than the module switching distance.

According to one example of the invention, the first detecting unit may be a short range sensing unit. The short range sensing unit may detect whether the distance between the viewer and the first window 140 is less than or equal to the module switching distance. The condition determination unit may determine whether the distance between the viewer and the first window 140 changes from greater than the module switching distance to less than or equal to the module switching distance according to the detecting result of short range sensing unit, or changes form less than or equal to the module switching distance to greater than the module switching distance.

Alternatively, according to another example of the invention, the first detecting unit may be a touch sensing unit disposed on the external surface of the hand-held electronic device to detect the grasping position of the viewer grasping the hand-held electronic device and determine whether the distance between the viewer and the first window 140 is less than or equal to the module switching distance according to the grasping position. The condition determination unit may determine whether the mode switching condition is met according to the detecting result by the touch sensing unit for the grasping gesture of the viewer.

When the condition determination unit determines that the mode switching condition is met, the mode controlling unit switches between the first working mode and the second working mode. For example, as described above, the mode switching condition may comprise a first mode switching condition and a second mode switching condition. When the condition determination unit determines that the first mode switching condition is met, the viewer is close to the first window 140, and the mode controlling unit switches the hand-held electronic device from the second working mode to the first working mode automatically. When the condition determination unit determines that the second mode switching condition is met, the viewer is away from the first window 140. The mode controlling unit switches the hand-held electronic device from the first working mode to the second working mode automatically.

According to one example of the invention, when the hand-held electronic device is operated in the first working mode, the mode controlling unit controls the image processing unit to provide the first image to the first display unit, so as to the first display unit to display; and when the hand-held electronic device is operated in the second working mode, the mode controlling unit controls the image processing unit to stop to provide the first image to the first display unit and the first display unit is closed.

Additionally, according to another embodiment of the invention, the hand-held electronic device 100 may further comprise: a first audio input unit and a second audio input unit. For example, when the hand-held electronic device 100 is a mobile phone, the first audio input unit may be an earpiece of the mobile phone and the second audio input unit may be a speaker. When the hand-held electronic device is operated in the first working mode, the mode controlling unit is also configured to open the first audio input unit, to output audio by the first audio input unit; when the hand-held electronic device is operated in the second working mode, the mode controlling unit is also configured to open the second audio input unit to output audio by the second audio input unit.

The hand-held device according to this embodiment may be switched between the first working mode in which the first display unit displays the first image by the hand-held electronic device and the second working mode of the hand-held electronic device (for example, when the hand-held electronic device is a mobile phone, the second working mode may be a normal working mode of the mobile phone) in order to control the opening and closing of the first display unit. Therefore, when the viewer needs not to watch the magnified image, the first display unit is closed to save electricity.

Figure 9:
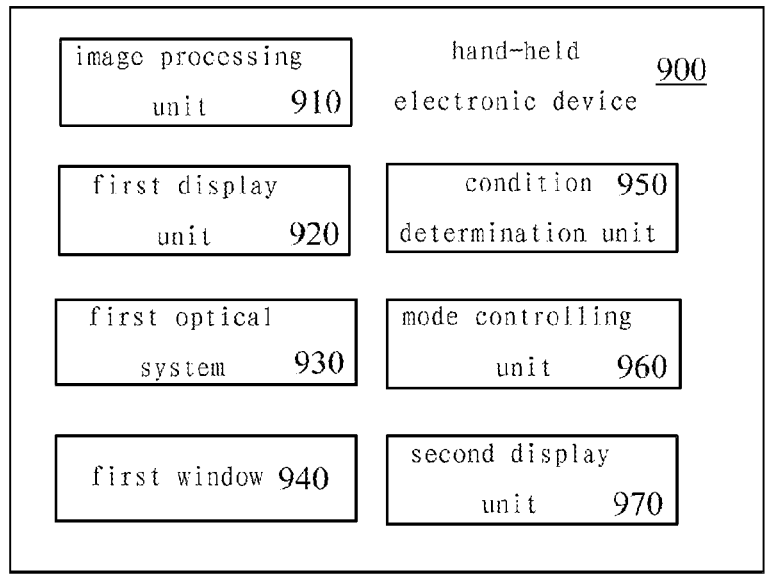
FIG. 9 is an exemplary block diagram showing a hand-held electronic device according to another embodiment of the invention.

FIG. 9 is an exemplary block diagram of hand-held electronic device according to another embodiment of the invention. Similar to the hand-held electronic device 100 shown in FIG. 1, a hand-held electronic device 900 comprises an image processing unit 910, a first display unit 920, a first optical system 930, a first window 940, a condition determination unit 950 and a mode controlling unit 960. Additionally, the hand-held electronic device 900 also comprises a second display unit 970.

The image processing unit 910 may provide a first image to the first display unit 920. The first image may be, for example, picture, video image or combination of text and picture and the like. The first display unit 920 may the first image provided by the display image processing unit 910. As shown in FIG. 9, in this embodiment, the first display unit 920 is a micro-display unit displayed inside the hand-held electronic device 900. Since the first display unit 920 has a very small screen size, in this embodiment, it is difficult for a user to watch the first image displayed by the first display unit 920 through naked eyes.

The first optical system 930 may receive light emitted from the first display unit 920 and conduct a light path conversion on it to form a first magnified virtual image. The first optical system 930 comprises a lens assembly composed of a first lens 931 and a second lens 932. The lens assembly has positive refractive power, i.e., the first lens 931 and the second lens 932 are equivalent to convex lenses.

As shown in FIG. 9, the first display unit 920 and the first optical system 930 are disposed along an optical axis of lens assembly (i.e., the first lens 931 and the second lens 932) correspondingly. In this embodiment, a length of a light path between the first optical system 930 and the first display unit 920 is less than a focal distance of the first optical system 930. More specifically, the length of the light path between the first optical system 930 and the first display unit 920 is less than the focal distance of the lens assembly. The distance between the first lens 931 and the second lens 932 and the distance between the first display unit 920 and the first optical system 930 may be determined according to a magnification required by the first optical system 930. For example, when the magnification required by the first optical system 930 is bigger, the length of the light path between the first optical system 930 and the first display unit 920 is longer. Additionally, the distance between the first optical system 930 and the first window 940 may be determined according to a predefined position of eyes of the viewer.

The first window 940 is disposed on the first external surface of hand-held electronic device to enable the viewer to watch the first magnified virtual image through the first optical system 930. As shown in FIG. 9, a size of the first window 940 may be corresponded to that of human eyes, and the first window 940 and the first optical system 930 are disposed along the optical axis of the lens assembly (i.e., the first lens 931 and the second lens 932) correspondingly. The first display unit 920 is disposed to a side of the first optical system 930 and the first window 940 is disposed to the other side of the first optical system 930 opposite to the first display unit 920 so as to the viewer watches the first magnified virtual image. The first window 940 may be disposed on a first external surface of a hand-held electronic device.

In this embodiment, the image processing unit 910 may also provide a second image to the second display unit 970. The second display unit 970 may display the second image. A display zone of the second display unit 970 is larger than that of the first display unit and the second display unit 970 allows the viewer to watch the second image directly. That is to say, there is no need to conduct a light path conversion by the optical system on the image displayed by the second display unit and the viewer may watch the second image displayed by the second display unit directly.

The second display unit 970 may be, for example, a display unit displayed on an external surface of the existing hand-held electronic device. That is to say, the size of screen of second display unit 970 is greater than that of the first display unit 920. Additionally, a resolution of the first display unit 920 may be higher than that of the second display unit 950. Therefore, the viewer can watch the clear first magnified virtual image. In the hand-held electronic device according to the embodiment of the invention, the size of the first magnified virtual image is greater than that of the second display unit 970. For example, the second display unit 950 may comprise a screen of 4 inches or 5 inches and the first magnified virtual image may be 50 inches.

The second display unit 970 may be disposed on a second external surface of the hand-held electronic device 900. The first external surface may be adjacent to the second external surface. As shown in FIG. 9, the first external surface is opposite to the second external surface. That is to say, the first display unit 920, the first optical system 930 and the first window 940 are disposed along directions of length or width of hand-held electronic device 900 correspondingly, in order to avoid increasing thickness of the hand-held electronic device 900.

The hand-held electronic device 900 may have a first working mode and a second working mode. The condition determination unit 950 may determine whether a mode switching condition is met, and when the condition determination unit 950 determines that a mode switching condition is met, the mode controlling unit 960 switches between the first working mode and the second working mode.

According to one example of the invention, the mode switching condition may comprise a first mode switching condition and a second mode switching condition, wherein the first mode switching condition is that the distance between the viewer and the first window changes from greater than the module switching distance to less than or equal to the module switching distance, and the second mode switching condition is that the distance between the viewer and the first window changes from less than or equal to the module switching distance to greater than the module switching distance. The hand-held electronic device 900 may further comprise a first detecting unit. The first detecting unit may determine whether the distance between the viewer and the first window is less than or equal to the module switching distance and obtain a detecting result. The condition determination unit 950 may determine whether the mode switching condition is met according to the detecting result.

For example, when the condition determination unit 950 determines that the first mode switching condition is met, the viewer is close to the first window 940 and the mode controlling unit 960 switches the hand-held electronic device from the second working mode to the first working mode automatically. When the condition determination unit determines that the second mode switching condition is met, the viewer is away from the first window 940. The mode controlling unit 960 switches the hand-held electronic device from the first working mode to the second working mode automatically.

In this example, when the hand-held electronic device is operated in the first working mode, the mode controlling unit 960 may control the image processing unit 910 to provide the first image to the first display unit 920 and to stop to provide the second image to the second display unit 970, open the first display unit 920 to display and close the second display unit 970; and when the hand-held electronic device is operated in the second working mode, the mode controlling unit 960 controls the image processing unit 910 to stop to provide the first image to the first display unit 920 but to provide the second image to the second display unit 970, close the first display unit 920 and open the second display unit 970 to display.

According to one example of the invention, the first image may be same as the second image. For example, when the viewer watches an image through the second display unit in the second working mode of the hand-held electronic device and desires to further magnify this image to watch, the eyes may be close to the first window of the hand-held electronic device. The hand-held electronic device is switched from the second working mode to the first working mode and displays the same image through the first display unit.

Additionally, according to another example of the invention, the first image and the second image may be associated with the same video file. For example, when the image processing unit plays a video file and provides the second image to the second display unit in the second working mode of the hand-held electronic device, but the viewer desires to further magnify to watch this video, the eyes may be close to the first window of hand-held electronic device. The hand-held electronic device switches from the second working mode to the first working mode, and the image processing unit may play this video file continuously (in an uninterrupted manner) and provide the first image to the first display unit.

In the hand-held electronic device according to the embodiment of the invention, the size of the image which a user may watch is not limited by the screen size of the hand-held device itself, such that the user can watch the display image with big size through the hand-held device while the portability of the hand-held device is kept. Additionally, the hand-held device according to the embodiment of the invention has a very low consumption and is not limited to ambient light compared to a micro-projector. The hand-held device according to the embodiment of the invention may be used in outdoors with strong light or indoors with weak light.

In the case that the hand-held electronic device has the first working mode and the second working mode, in the example shown in FIG. 7a and FIG. 7b, it may be switched between the working modes according to an angle between the first housing and the second housing. For example, the mode switching condition comprises a third mode switching condition and a fourth mode switching condition, wherein the third mode switching condition is that the angle between the first housing and the second housing changes from less than a predetermined switching angle to the predetermined switching angle, and the fourth mode switching condition is that the angle between the first housing and the second housing changes from greater than the predetermined switching angle to less than the predetermined switching angle. When the condition determination unit is determined to meet the third mode switching condition, the mode controlling unit switches the hand-held electronic device from the second working mode to the first working mode automatically; and when the condition determination unit is determined to meet the fourth mode switching condition, the mode controlling unit switches the hand-held electronic device from the first working mode to the second working mode automatically.

Additionally, in the case that the hand-held electronic device has the first working mode and the second working mode, in the example shown in FIG. 8a and FIG. 8b, it may be switched between the working modes according to a relative moving distance between the first housing and the second housing. For example, the mode switching condition comprises a fifth mode switching condition and a sixth mode switching condition, wherein the fifth mode switching condition is that the relative moving distance between the first housing and the second housing changes from less than the predetermined moving distance to greater than the predetermined moving distance, and the sixth mode switching condition is that the relative moving distance between the first housing and the second housing changes from greater than the predetermined moving distance to less than the predetermined moving distance. When the condition determination unit is determined to meet the third mode switching condition, the mode controlling unit switches the hand-held electronic device from the second working mode to the first working mode automatically; and when the condition determination unit is determined to meet the fourth mode switching condition, the mode controlling unit switches the hand-held electronic device from the first working mode to the second working mode. Additionally, the hand-held device according to the embodiment of the invention may be switched between the first working mode in which the hand-held electronic device displays the first image through the first display unit and the second working mode of the hand-held electronic device (for example, when the hand-held electronic device is a mobile phone, the second working mode may be a normal working mode of the mobile phone), in order to control the opening and closing of the first display unit. Therefore, when the viewer needs not to watch a magnified image, the first display unit is closed to same electricity.

Additionally, according to another example of the invention, the hand-held electronic device 300 may further comprise a first input unit and a second input unit. When the hand-held electronic device is operated in the first working mode, the first input unit may receive a first input which is used for controlling the first image provided by the image processing unit when the hand-held electronic device is operated in the first working mode. When the hand-held electronic device is operated in the second working mode, the second input unit may receive a second input which is used for controlling the second image provided by the image processing unit when the hand-held electronic device is operated in the second working mode. The first input unit and the second input unit may be, for example, touch screen, button, and the like.

Additionally, in the case that the image processing unit may comprise a reproduction module as described above, when the hand-held electronic device is switched from the second working mode to the first working mode, the mode controlling unit may control the mode controlling unit to open, and the image processing unit may generate the first image according to the third image.

Figure 10:
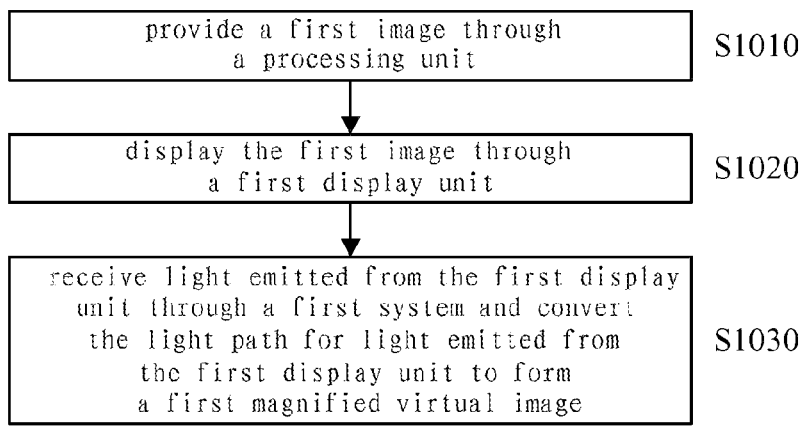
FIG. 10 is a flowchart describing a display method according to an embodiment of the invention.

Hereinafter, a display method of the embodiment of the invention will be illustrated with respect to FIG. 10. FIG. 10 is a flowchart describing a display method 1000 according to the embodiment of the invention. The display method 1000 is used for the hand-held electronic device. The respective steps in the display method 1000 may be accomplished by respective unit in the hand-held electronic device in FIG. 1 to FIG. 6, which, thus for a brief description, will not be described.

As shown in FIG. 10, in step S1010, a first image is provided by an image processing unit. The first image may be, for example, picture, video image or combination of text and picture. The image processing unit may be a central image processing unit of the hand-held electronic device (for example, CPU), or alternatively, may be an image processing unit disposed separately physically or logically.

In step S1020, the first image is displayed by the first display unit. According to one example of the invention, the first display unit may be a micro-display unit, the size of screen of which is less than that of the existing hand-held device. Additionally, according to another embodiment of the invention, the first display unit has a relatively high resolution. Specifically, the resolution of the screen of the first display unit may be higher than that of the existing hand-held device. For example, the first display unit may employ a display screen meeting the high definition or the full high definition standard. Since the screen size of the first display unit is very small, in the example of the invention, it is difficult for the user to the first image displayed by the first display unit through naked eyes.

In step S1030, the first optical system receives light emitted from the first display unit and conducts a light path conversion on it to form a first magnified virtual image, wherein a length of a light path between the first optical system and the first display unit is less than a focal distance of first optical system. That is to say, the first optical system has positive refractive power. A magnification of first optical system may be preset. Alternatively, the first optical system may comprise a first adjusting component to adjust the magnification of the first optical system. By a first window disposed on a first external surface of the hand-held electronic device, the viewer may watch the magnified virtual image of the first image via the first optical system.

By the display method provided by the above embodiment of the invention, the image size which the user may watch is not limited to the screen size of the hand-held device itself, such that the user may watch a display image with a relatively big size through the hand-held device while the portability of the hand-held device is kept. Additionally, compared with a micro-projector, the hand-held device according to this embodiment has considerably low consumption and not limited by ambient light. The hand-held device according to the embodiment of the invention may be used to watch a video or a picture both in outdoors with strong light and indoors with weak light.

Additionally, as described above, since the viewer can just watch the first magnified virtual image through the first optical system when close to the first external surface, such that the content watched by the user is avoided to be seen or peeped by others so as to improve the privacy.

Additionally, according to another example of the invention, the hand-held electronic device may have a first working mode and a second working mode. When the hand-held electronic device is operated in the first working mode, the first display unit is open to display the first image by the first display unit, and when the hand-held electronic device is operated in the second working mode, the first display unit is closed.

In this case, the method in FIG. 10 may further comprise determining whether a mode switching condition is met. According to one example of the invention, the mode switching condition may comprise a first mode switching condition and a second mode switching condition, wherein the first mode switching condition is that a distance between the viewer and the first window changes from greater than a module switching distance to less than or equal to the module switching distance, and the second mode switching condition is that the distance between the viewer and the first window changes from less than or equal to the module switching distance to greater than the module switching distance. In step S604, it is determined whether the distance between the viewer and the first window is less than or equal to the module switching distance and a detecting result is obtained, and it is determined that whether the mode switching condition is met according to the detecting result.

When it is determined that the mode switching condition is met, the method in FIG. 10 may further comprise switching between the first working mode and the second working mode. For example, as described above, the mode switching condition may comprise a first mode switching condition and a second mode switching condition. When it is determined that the first mode switching condition is met, the viewer is close to the first window of the hand-held electronic device. Therefore, the hand-held electronic device may be switched from the second working mode to the first working mode automatically. When it is determined that the condition determination unit is met the second mode switching condition, the viewer is away from the first window. Accordingly, the hand-held electronic device may be switched from the first working mode to the second working mode automatically.

According to one example of the invention, when the hand-held electronic device is operated in the first working mode, the first image is provided to the first display unit so as to the first display unit display; and when the hand-held electronic device is operated in the second working mode, first image is stopped to be provided to the first display unit and the first display unit is closed.

Additionally, according to another embodiment of the invention, the hand-held electronic device may further comprise a first audio input unit and a second audio input unit. For example, when the hand-held electronic device is a mobile phone, the first audio input unit may be an earpiece of mobile phone and the second audio input unit may be a speaker. the method shown in FIG. 10 may further comprise that mode controlling unit is also configured to open the first audio input unit to output audio through the first audio input unit when the hand-held electronic device is operated in the first working mode; and the mode controlling unit is also configured to open the second audio input unit to output audio through the second audio input unit when the hand-held electronic device is operated in the second working mode.

In a method 600 of the switching working mode according to embodiment of the invention, the u image size that the user may watch may not be limited by the screen size of the hand-held device itself, such that the user may watch a display image with a relatively big size through the hand-held device while the portability of the hand-held device is kept. Additionally, compared with a micro-projector, the hand-held device according to this embodiment has considerably low consumption and not limited by ambient light. The hand-held device according to the embodiment of the invention may be used to watch a video or a picture both in outdoors with strong light and indoors with weak light.

According to the method of the embodiment of the invention, the hand-held electronic device may be switched between the first working mode in which the first display unit displays the first image and the second working mode of hand-held electronic device (for example, when the hand-held electronic device is a mobile phone, the second working mode may be a normal working mode of the mobile phone), in order to control the opening and closing of the first display unit. Therefore, when the viewer needs not to watch the magnified image, the first display unit is closed to save electricity.

Additionally, for convenience of the user watching the magnified first image through two eyes at the same time, according to another embodiment of the invention, the method shown in FIG. 10 may further comprise while the first image is provided to the first display unit and the first image is displayed by the first display unit, the first image is provided to and displayed by the third display unit and light emitted from the third display unit is received by and conducted by light path conversion by the second optical system, to form a second magnified virtual image, wherein the length of the light path between the second optical system and the third display unit is less than the focal distance of second optical system. According to one example of the invention, the first optical system and the second optical system may be adjusted according to the distance between the eyes of the viewer.

Additionally, when the hand-held electronic device is operated in the first working mode, while the first display unit is open, the third display unit may be open to display the first image by the third display unit. When the hand-held electronic device is operated in the second working mode, similar to the first display unit, the first image may be stopped to be provided to the third display unit and the third display unit is closed.

Additionally, according to another embodiment of the invention, the method shown in FIG. 10 may further comprise that a third image is collected in the first working mode and the first image is generated according to the third image. For example, the hand-held electronic device may comprise a reproduction module. The reproduction module may reproduce a second image, such as picture, video image, or combination of text and picture. The first image may be generated according to the third image and the second image. For example, in the first image, the image processing unit may dispose the third image on the lower layer of the second image, and set the second image into a first transparency, alternatively, the image processing unit may dispose the third image on the lower layer of the second image, and set the size of the second image as less than that of the third image, such that the user can see the surroundings while watching the reproduced video image.

Additionally, according to another embodiment of the invention, the hand-held electronic device may comprise: a hinge capable of rotating about a center thereof, a first housing connected to the hinge, which can rotate relative the center of the hinge and a second housing connected to the hinge, which can rotate relative to the center of the hinge. At least a portion in the first optical system is disposed in the first housing of the hand-held electronic device, and the first housing is a housing which is at least partially transparent. The device may be switched between the working modes according to an angle between the first housing and the second housing. For example, mode switching conditions comprises a third mode switching condition and a fourth mode switching condition, wherein the third mode switching condition is that the angle between the first housing and the second housing changes from less than a predetermined switching angle to greater than the predetermined switching angle, and the fourth mode switching condition is that the angle between the first housing and the second housing changes from the predetermined switching angle to less than the predetermined switching angle.

Accordingly, when the mode switching condition is met, switching between the first working mode and the second working mode may comprise: when it is determined that the third mode switching condition is met, the hand-held electronic device is switched from the second working mode to the first working mode automatically; and when it is determined that the fourth mode switching condition is met, the hand-held electronic device is switched from the first working mode to the second working mode automatically.

Additionally, according to another embodiment of the invention, the hand-held electronic device may comprise: a first housing and a second housing. Specifically, the first housing can be connected to the second housing of hand-held electronic device through a sliding rail device, and can be moved relative to the second housing along the sliding rails. Similarly, the second housing may be connected to the first housing of hand-held electronic device thought a sliding rail device, and can be moved relative to the first housing along the sliding rails. The rails of the sliding rail device may be disposed on one of the first housing and the second housing, and sliding components may be disposed on another of the first housing and the second housing. At least a portion of the first optical system in the hand-held electronic device is disposed in the first housing of the hand-held electronic device, and the first housing is a housing which is at least partially transparent.

According to one example of the invention, the device may be switched between the working modes according to a relative moving distance between the first housing and the second housing. For example, mode switching conditions may comprise a fifth mode switching condition and a sixth mode switching condition, wherein the fifth mode switching condition is that the relative moving distance of the first housing and the second housing changes from less than a predetermined moving distance to greater than the predetermined moving distance, and the sixth mode switching condition is that the relative moving distance between the first housing and the second housing changes from greater than the predetermined moving distance to less than the predetermined moving distance.

Accordingly, when it is determined that the mode switching condition is met, switching between the first working mode and the second working mode may comprise: when it is determined that the third mode switching condition is met, the hand-held electronic device is switched from the second working mode to the first working mode automatically; and when it is determined that the fourth mode switching condition is met, the hand-held electronic device is switched from the first working mode to the second working mode automatically.

Those skilled in the art may recognize that the invention can be achieved by electronics hardware, computer software or combination of the two, combined with units and algorithms in respective example described by the embodiments disclosed by the description step. In order to illustrate the exchangeability of the hardware and software clearly, the compositions and steps of the respective examples have already been described generally according to functions step. Whether these functions are performed by software or hardware depends on the specific applications and constriction conditions for design of the technical solution. Those skilled in the art may use different method for each of specific application to achieve the functions described, but such an achievement should not be considered to go beyond the scope of the invention.

Those skilled in the art should understand that various modifications, combinations, partial combinations and alternations may be made to the invention depending on the design requirement and other factors, as long as they are within the scope of the appended claims and their equivalents.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed:

1. A hand-held electronic device comprising:
   an image processing unit configured to provide a first image;
   a first display unit configured to display the first image;
   a first optical system configured to receive light emitted from the first display unit and conduct a light path on the light emitted from the first display unit to form a first magnified virtual image, wherein a length of a light path between the first optical system and the first display unit is less than a focal distance of the first optical system and the first optical system comprises a lens assembly having positive refractive power;
   a first window disposed on a first external surface of the hand-held electronic device to allow a viewer to watch the first magnified virtual image through the first optical system when close to the first external surface;
   a second display unit configured to display a second image, wherein the second display unit has a display zone larger than a display zone of the first display unit, and the second display unit allows the viewer to directly watch the second image,
   a second light guiding component configured to deliver light passing through the lens assembly to a third light guiding component; and
   a protective component disposed on a side facing the viewer and in the first optical system to protect the lens assembly,
   wherein the third light guiding component receives light delivered by the second light guiding component and reflects it to the first window,
   the third light guiding component is disposed in the protective component,
   the second display unit is disposed on the first external surface of the hand-held electronic device, and
   the protective component covers the second display unit and overlaps the second display unit.

2. The hand-held electronic device according to claim 1, wherein the first optical system further comprises a first adjusting component configured to change the length of the light path between the lens assembly and the first display unit to adjust size of the first magnified virtual image.

3. The hand-held electronic device according to claim 1, wherein
   the third light guiding component comprises a plurality of light reflection assemblies disposed in parallel;
   when the viewer faces the first external surface, the viewer can watch the first magnified virtual image of the first image displayed by the first display unit through the light reflection assemblies and watch the second image through the second display unit viewer directly.

4. The hand-held electronic device according to claim 1, further comprises:
   a hinge capable of rotating about a center of the hinge;
   a first housing connected to the hinge, such that the first housing can rotate relative to the center of the hinge, wherein at least the third light guiding component and the first window are disposed in the first housing of the hand-held electronic device, and the first housing is a housing which is at least partially transparent; and
   a second housing connected to the hinge, such that the second housing can rotate relative to the center of the hinge.

5. The hand-held electronic device according to claim 1, further comprises:
   a first housing connected to the second housing of hand-held electronic device through a sliding rail device and moved relative to the second housing along sliding rails, wherein at least the third light guiding component and the first window are disposed in the first housing of hand-held electronic device and the first housing is a housing which is at least partially transparent; and
   a second housing connected to the first housing of hand-held electronic device through the sliding rail device and moved relative the first housing along the sliding rails.

6. The hand-held electronic device according to claim 1, further comprises:
   a third display unit configured to display the first image;
   a second optical system configured to receive light emitted from the third display unit and conduct light path conversion on the light emitted from the third display unit to form a second magnified virtual image, wherein a length of a light path between the second optical system and the third display unit is less than a focal distance of second optical system;
   a second window disposed on the first external surface of the hand-held electronic device to allow the viewer to watch the second magnified virtual image through the second optical system when close to the first external surface; and
   a second adjusting component configured to adjust the first optical system and/or the second optical system according to a distance between two eyes of the viewer.

7. The hand-held electronic device according to claim 1, further comprises:
   a short range sensing unit configured to detect a distance between the viewer and the first window, generate a distance detecting result, and transmit the distance detecting result to the image processing unit; and
   wherein the image processing unit controls working modes of the hand-held electronic device according to the distance detecting result.

8. The hand-held electronic device according to claim 7, wherein the image processing unit controls the opening and closing of the first display unit according to the distance detecting result.

9. The hand-held electronic device according to claim 1, further comprises:
   a condition determination unit configured to determine whether a mode switching condition is met;
   a mode controlling unit configured to switch between the first working mode and the second working mode when the condition determination unit determines that a mode switching condition is met,
   wherein the hand-held electronic device has a first working mode and a second working mode; when the hand-held electronic device is operated in the first working mode, the first display unit is open to display the first image by the first display unit, and when the hand-held electronic device is operated in the second working mode, the first display unit is closed.

10. A display method applied to a hand-held electronic device, the method comprising:
   providing a first image by an image processing unit;
   displaying the first image by a first display unit;
   receiving light emitted from the first display unit and conducting a light path conversion on the light emitted from the first display unit by a first optical system to form a first magnified virtual image, wherein a length of a light path between the first optical system and the first display unit is less than a focal distance of first optical system;
   providing the first image to a third display unit;
   displaying the first image by the third display unit;
   receiving light emitted from the third display unit and conducting a light path conversion on the light emitted from the third display unit by a second optical system to form a second magnified virtual image, wherein a length of a light path between the second optical system and the third display unit is less than a focal distance of the second optical system
   determining whether a mode switching condition is met; and
   switching between the first working mode and the second working mode when it is determined that a mode switching condition is met,
   wherein the hand-held electronic device has a first working mode and a second working mode; when the hand-held electronic device is operated in the first working mode, the first display unit is open to display the first image by the first display unit, and when the hand-held electronic device is operated in the second working mode, the first display unit is closed.

11. The display method according to claim 10, further comprising:
   providing the first image to the first display unit when the hand-held electronic device is operated in the first working mode; and
   stopping to providing the first image to the first display unit when the hand-held electronic device is operated in the second working mode.

12. The display method according to claim 10, wherein when the hand-held electronic device is operated in the first working mode, the third display unit is open to display the first image through the third display unit; and when the hand-held electronic device is operated in the second working mode, stop to provide the first image to the third display unit and the third display unit is closed.

* * * * *